Sept. 23, 1958     E. A. OLSON     2,853,074
STAPLING INSTRUMENT FOR SURGICAL PURPOSES Filed June 15, 1956     2 Sheets—Sheet 1

Inventor
Edward A. Olson
by Roberts, Cushman & Grover
Att'ys

Sept. 23, 1958 E. A. OLSON 2,853,074
STAPLING INSTRUMENT FOR SURGICAL PURPOSES
Filed June 15, 1956 2 Sheets-Sheet 2
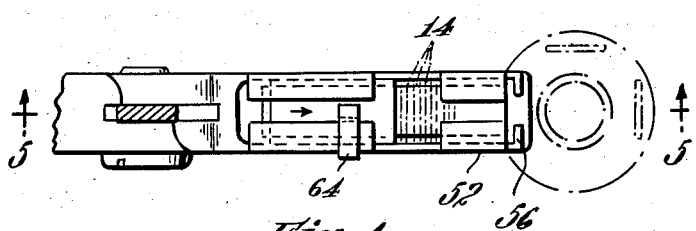
Fig. 4
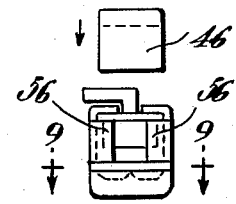
Fig. 6
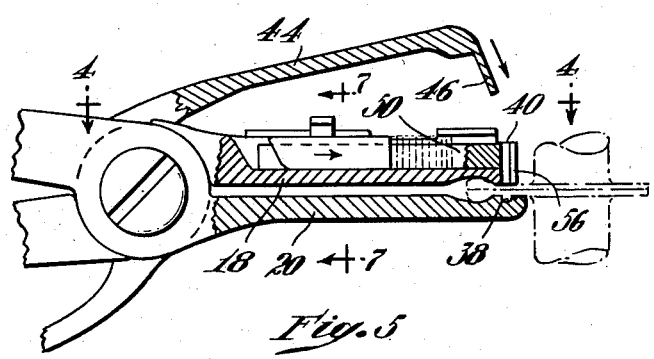
Fig. 5
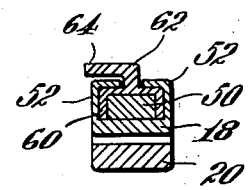
Fig. 7
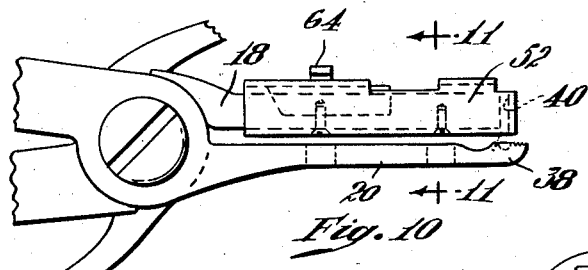
Fig. 10
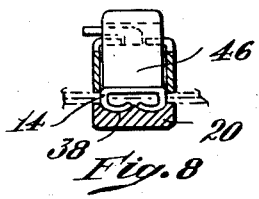
Fig. 8
Fig. 9
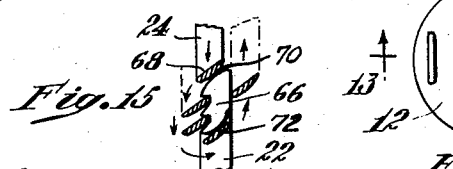
Fig. 15
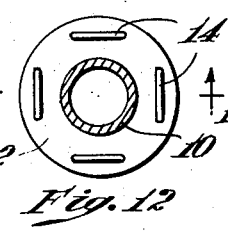
Fig. 12
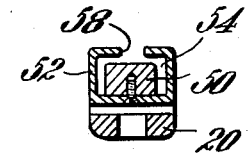
Fig. 11
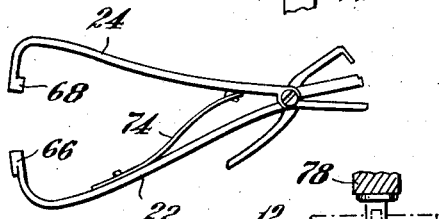
Fig. 14
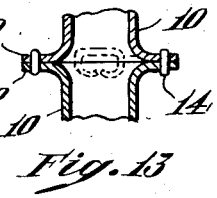
Fig. 13
Fig. 16
Inventor
Edward A. Olson
by Roberts, Cushman & Grover
Attys United States Patent Office 2,853,074
Patented Sept. 23, 1958

2,853,074

STAPLING INSTRUMENT FOR SURGICAL PURPOSES

Edward A. Olson, Ashland, Mass.

Application June 15, 1956, Serial No. 591,672

10 Claims. (Cl. 128—322)

This invention relates to a surgical implement and more especially to implements for repairing body structure, and in particular to joining the adjacent ends of blood vessels such as veins, arteries and other tubular structures. It is to be understood however that it may be equally useful for repairing other body structures of non-tubular nature such as muscles, ligaments, viscera, etc.

An object of this invention is to provide an implement for holding the adjacent ends of a vein together and applying fastening means. Another object is to provide an implement in which the means for holding the adjacent ends of a vein together and means for applying the fastening means are independently operable so that the vein ends may be held together without necessarily applying the fastening means, and so that if desired the holding means may be released and shifted to a better place for joining if after inspection this is to be desired. Another object is to provide means for latching the holding means thereby to hold the ends of the veins together until it is desirable to shift the implement to another place or until the joining operation is consummated. Another object is to provide latching means which is engageable and disengageable by continuous movement in one direction, to wit by squeezing, which is the natural function of the hand. Other objects are to provide an implement which is of simple design, has relatively few parts and is reliable in operation.

In accordance with the invention the surgical instrument comprises a pair of pivoted jaws with handles for bringing them into clamping engagement, one of the jaws having near its end an anvil and the other having a vertical guide for receiving and holding a single staple in vertical alignment with the anvil. There is means carried by one of the jaws for supplying staples, one at a time, to the guide and a driver operable independently of the jaws carrying a driving element arranged to enter the guide to thrust it therefrom through the clamped material against the anvil so as to clinch it.

The invention will now be described in greater detail with reference to the accompanying drawings wherein:

Fig. 4 is a plan view of the staple carrying jaw to much larger scale taken on the line 4—4 of Fig. 5, the driver being omitted;

Fig. 5 is a vertical section taken on the line 5—5 of Fig. 4 with the anvil jaw in section below it and the driver in section above it;

Fig. 6 is an elevation as seen from the right end of Fig. 5;

Fig. 7 is a vertical section taken on the line 7—7 of Fig. 5;

Fig. 8 is a vertical section taken on the line 8—8 of Fig. 3 showing a staple clinched against the anvil;

Fig. 9 is a horizontal section taken on the line 9—9 of Fig. 6, showing the clinching recesses at the forward end of the lower jaw;

Fig. 10 is an elevation of the jaws with the driver omitted;

Fig. 11 is a vertical section taken on the line 11—11 of Fig. 10, showing the staple groove;

Fig. 12 is a section taken in a plane perpendicular to the axis of a vein above or below the junction of its ends after joining showing the flanges of the adjacent ends of the veins folded outwardly at right angles to the axis of the vein with staples inserted at 90° intervals;

Fig. 13 is a vertical diametrical section taken on the line 13—13 of Fig. 12;

Fig. 14 is an alternative form of the implement;

Fig. 15 is an end view of the handle locking and releasing means for the alternative form of the implement; and Fig. 16 is an elevation showing a split rivet type fastener with means for driving and clinching it.

Heretofore metal pins, wires and rivets have been employed in repairing bone structure in the body, however, in so far as is known metal fasteners have not been employed to join such parts of the body as blood vessels, muscles, ligaments, viscera, and the like. In one aspect therefore the invention illustrated herein resides in employing metal fasteners in lieu of sutures for connecting together ruptured, torn or severed ends of the softer body structure as referred to above. Preferably these fasteners take the form of staples of the conventional shape having a pair of substantially spaced parallel legs joined at one end by a bridge piece which may be inserted and clinched. The staples herein employed are made of stainless steel, however, any suitable metal may be employed provided it has the requisite strength and is resistant to the corrosive action of the body fluids.

While staples are specifically illustrated herein and the apparatus shown for emplacing them is designed specifically for staple driving and clinching, it is to be understood that it is within the scope of the invention to employ fastening means such as split metal rivets or two-part rivets and that the method herein described embraces the use of rivets as well as staples.

As herein illustrated, Figs. 12 and 13, the adjacent ends of a vein 10 which for some reason have been divided and has to be made whole again are joined by folding or spreading the adjacent ends outwardly to provide radially extending flanges 12 which are abutted and while held in abutment inserting fastening elements 14 through the flanges from one side to the opposite and then clinching them. The elements 14 may be distributed at whatever interval is necessary to provide the security desired and are here shown at 90° intervals.

Figure 1:
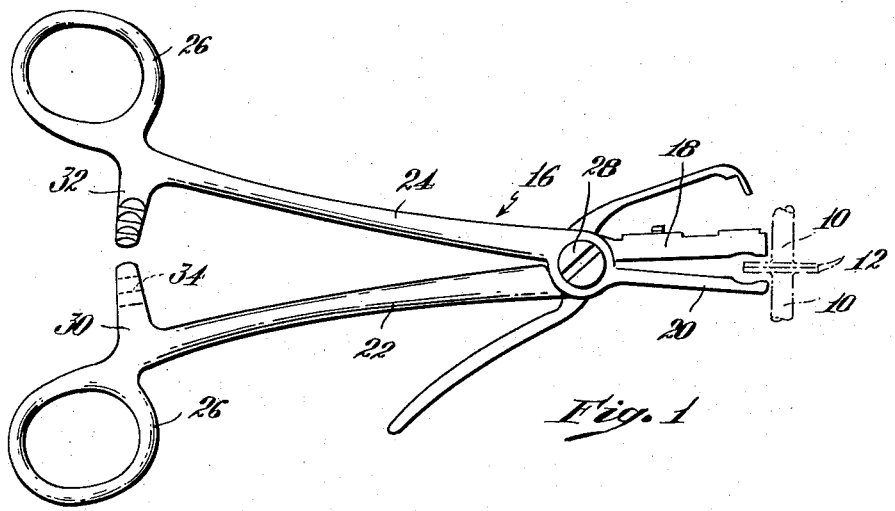
Fig. 1 is an elevation of the implement in the preferred form, showing the clamping jaws open in readiness to be brought into clamping engagement with the parts to be joined and the driver retracted.
Figure 2:
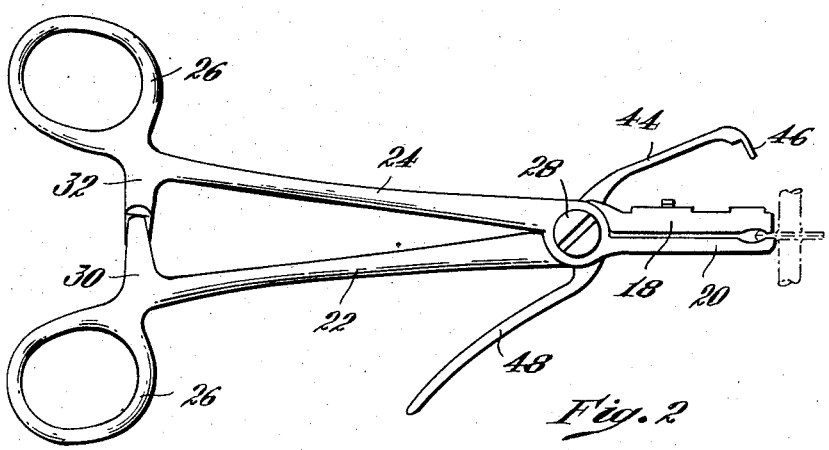
Fig. 2 is an elevation of the implement showing the clamping jaws engaged and locked in engagement by the locking means with the driver still retracted.
Figure 3:
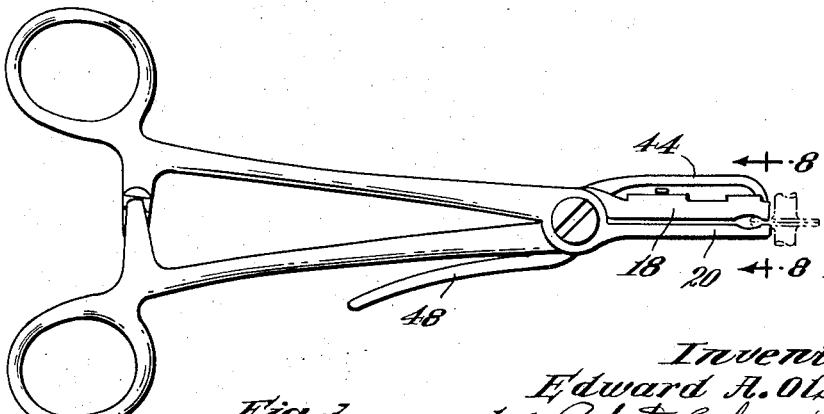
Fig. 3 is an elevation of the implement showing the jaws engaged and the staple driving element in its operative position.

An implement suitable for the purpose of inserting and clinching staples is shown generally at 16 (Figs. 1 to 3 inclusive), and is comprised of clamping jaws 18 and 20 which are arranged to be brought together into clamping engagement with the flanges 12 of the abutting ends of the vein 10 and to hold them clamped together while the staple is inserted. The jaws 18 and 20 are provided with rearwardly extending handles 22 and 24 which terminate in finger loops 26 and are pivotally connected by a pin 28 so as to be operable in a manner similar to a pair of scissors or pliers. To hold the jaws clamped with the flanged ends of the veins the arms 22 and 24 have near their finger loops projections 30 and 32 which are laterally offset with reference to the plane of the arms so that when the arms are brought together by squeezing the parts 30 and 32 have sliding overlapping contact as shown in Fig. 2. The inner sides of the members 30 and 32 have ratches in the form of a series of teeth oppositely inclined so that they interengage and become locked when the arms are squeezed together to hold the jaws tightly clamped against the flanges. The parts 30 and 32 are set close enough to each other so that a pronounced wedging action takes place as their teeth interlock which deflects the arms slightly in opposite directions so that the spring of the arms yieldably hold the teeth engaged. Disengagement of the toothed portions is effected by further squeezing the handles and pressing laterally in opposite directions to clear the teeth and then spreading the handles apart.

The lower jaw 20 constitutes an anvil and has near its extremity on its inner side, as shown in Fig. 9, clinching recesses 38 for receiving the ends of the legs of a staple and bending them over. The upper jaw 18 is the staple carrying element and has at its forward end a vertically disposed staple guide 40 which is aligned with the staple clinching recesses 38 in the lower jaw when the jaws are brought together as shown in Figs. 5, 8 and 10. The guide 40 is adapted to receive a staple 14 with its legs pointing downwardly with reference to the anvil in readiness for being driven through the flanges of the vein to be joined and is driven and clinched in place by a staple driver 44 having a driving element 46 arranged to enter the guide 40 and to push the staple located therein downwardly through the flanges against the anvil, as shown in Fig. 8. The driver 44, as will be seen by reference to Figs. 1 to 3 and 5, is mounted to pivot on the same pin 26 that the jaws are pivoted on but is operable independently thereof by a handle 48 which for convenience is located on the underside of the implement and forwardly of the pivot point so that it may be grasped by one or more fingers of the operator while still retaining his hold on the handles 22 and 24. Pivotal movement of the driver causes the driving element 46 to enter the top of the groove 40 and to move downwardly through it.

The jaw 18 is provided with a magazine for storing a quantity of staples which may be advanced one at a time to the guide 40 for driving. The magazine is constituted by a bar 50 fastened to the top of the jaw 18 and spaced walls 52 which parallel the sides and top of the bar 50 so as to leave a U-shaped space 54 along the bar 50, as shown in Fig. 11, within which a rod of joined staples of conventional kind may be placed. That portion of the wall 52 along the top of the bar has a longitudinal slot 58 in it and a U-shaped transfer element 60, Fig. 7, is mounted on the bar 50 within the U-shaped space 54. The transfer element has a stem 62 extending upwardly therefrom through the slot 58 and a lateral finger 64 by which it may be moved longitudinally in the space 54 behind the bar of staples which are arranged astride the bar 50 for forcing them forwardly to advance the leading one of the staples into the guide 40. As each staple is driven the finger 64 is pushed forwardly to advance the next staple into the guide.

In Fig. 14 the implement is shown with a modified handle structure which makes it somewhat easier to disengage the locking means. As there shown the end portions of the handles 22 and 24 have longitudinally offset ratch and detent means 66 and 68 which are movable into overlapping engagement by squeezing the handles into jaw clamping position. As illustrated in Fig. 15 the upper edge of the ratch 66 has an inclined cam surface 70, and as the lower end of the dent is brought into engagement with the surface 70 the handles are deflected laterally. This lateral deflection provides spring action for holding the dent yieldably engaged with the ratch. At the bottom of the ratch there is an inclined shoulder 72 and this operates when the arms are squeezed so as to move the dent beyond the lowermost tooth of the ratch to cam the dent and arm laterally in the opposite direction, that is to the back side of the ratch. This side of the ratch is smooth so that the dent slides upwardly along the surface without catching. Thus by further squeezing the arms so as to move the dent 68 all the way by the ratch 66, as shown in Fig. 15, the parts become disengaged and the arm 24 is cammed laterally so as to be released. A spring 74 is interposed between the handles so as to separate them when squeezing pressure is released.

It is, of course, within the scope of this invention to insert the fastening elements by hand, however, the implement in either form as herein illustrated provides means for inserting and clinching them with maximum ease, avoiding fumbling with individual staples and insuring uniform clinching under the most adverse conditions.

It is to be understood that though the implement is herein illustrated for use in joining the ends of veins, it can be used in all kinds of surgical operations where body parts are required to be mutually connecting pending mutual growth of the parts together.

As referred to above it is possible to use split rivets in place of staples and Fig. 16 represents broadly an anvil 76 and driver 78 for setting and clinching rivets without going into the details of any particular implement.

The use of metal fasteners and an implement such as illustrated herein have very great advantages over the conventional method of using a suture because of the fact that the joining operation can be done much faster, much more accurately and much easier which is important where time is of the essence in many difficult modern surgical operations.

It should be understood that the present disclosure is for the purpose of illustration only and that this invention includes all modifications and equivalents which fall within the scope of the appended claims.

I claim:

1. A surgical implement comprising a pair of pivoted jaws with handles for bringing them into clamping engagement, one of said jaws having near its end an anvil, the other having a vertical guide for receiving and holding a single staple in vertical alignment with the anvil, means carried by said jaws for supplying staples one at a time to said guide, a driver operable independently of the jaws having a driving element arranged to enter the guide to thrust it from the guide through the clamped material against the anvil to clinch it.

2. In a surgical implement according to claim 1, interengageable ratch means carried by the handles interengageable independently of the operation of the driver to hold the jaws clamped together during stapling.

3. In a surgical implement according to claim 1, ratch means carried by the handles, said ratch means being variably engageable independently of the operation of the driver to hold the jaws clamped in engagement at different pressures.

4. In a surgical implement according to claim 1, ratches carried by the handles, said ratches being engageable by squeezing the handles to bring the jaws together, and operable when engaged to prevent retrogression, said handles being yieldable enough so that they may be flexed toward each other by additional squeezing pressure even after the jaws are engaged to disengage the ratches and hence to release the handles.

5. In a surgical implement according to claim 1, mutually engageable ratch and dent means carried by laterally and longitudinally offset portions of the handles, said ratch and dent means being engageable by squeezing the handles toward each other and being disengageable by continued squeezing of the handles toward each other after the jaws are brought into clamping engagement.

6. In a surgical implement according to claim 1, mutually interlocking, oppositely inclined toothed elements engageable and disengageable by squeezing the handles together and a spring element arranged between the handles to spread them apart thereby to open the jaws when the ratch elements have been disengaged and the squeezing pressure released.

7. In a surgical implement according to claim 1, mutually interengageable, oppositely inclined toothed elements movable into end to end proximity by squeezing the handles together, cam means at the ends of the toothed elements operable by further squeezing of the handles to deflect them laterally to engage the toothed portions, said handles being yieldable in the direction of squeeze after the jaws have been brought into clamping engagement to move the toothed portions by each other, other cam means at the lower end of one of the toothed portions for camming the other toothed portion laterally in the opposite direction upwardly along the rear side of the one toothed part and a spring between the jaws for spreading the handles apart when the teeth are disengaged and squeezing pressure is released.

8. A surgical implement comprising a pair of pivoted jaws with handles for bringing them into clamping engagement, one of said jaws having near its end an anvil, the other jaw carrying a guide arranged transversely of the jaws and in vertical alignment with the anvil when the jaws are engaged, a magazine on said other jaw for supplying a plurality of staples, legs down with respect to the anvil and parallel to the plane of the guide, a staple advancer on said other jaw for advancing the leading one of the staples into the guide and a driver operable independently of the jaws after they are clamped against the substance to be stapled, said driver having a driving element arranged to enter the top of the guide and to thrust the staple from the guide through the substance between the jaws against the anvil.

9. A surgical implement comprising a pair of pivoted jaws with handles for bringing them into clamping engagement, one of said jaws having near its end an anvil, the other having a guide for receiving and holding a single staple in vertical alignment with the anvil, a track on said other jaw for receiving a plurality of staples astride it, with their legs down with respect to the anvil and in a plane paralleling the plane of the guide, walls spaced from and paralleling the top and sides of the track and providing a U-shaped channel for the staples to slide along, a U-shaped transfer slide mounted on the track in the U-shaped channel, one of said walls having a slot along it, an ear extending from the transfer slide through the slot and operable to advance the slide along the track to advance a staple into the guide, a driver operable independently of the jaws having a driving element adapted to enter the guide and to thrust the staple therefrom through the material between the jaws against the anvil and a lever extending rearwardly from the jaws along the underside of the lower one of the handles for operating the driving element.

10. A surgical instrument according to claim 1 in which the staple guide is disposed transversely of the jaw so that the staple is driven at right angles to the disposition of the instrument.

References Cited in the file of this patent

UNITED STATES PATENTS

| 452,097 | Cohen | May 12, 1891 |
| 1,452,373 | Gomez | Apr. 17, 1923 |
| 2,301,622 | Hambrecht | Nov. 10, 1942 |
| 2,633,571 | Boroughs | Apr. 7, 1953 |

OTHER REFERENCES

Operative Surgery, vol. II, of Bickham (pages 9 and 12). Copyright 1924. Copy in Div. 55.